US010167235B2

United States Patent
Izumi et al.

(10) Patent No.: US 10,167,235 B2
(45) Date of Patent: *Jan. 1, 2019

(54) JOINED BODY AND METHOD FOR PRODUCING THE SAME

(71) Applicant: NGK Insulators, Ltd., Nagoya (JP)

(72) Inventors: Yunie Izumi, Nisshin (JP); Yoshimasa Kobayashi, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 227 days.

This patent is subject to a terminal disclaimer.

(21) Appl. No.: 14/848,938

(22) Filed: Sep. 9, 2015

(65) Prior Publication Data

US 2016/0046531 A1    Feb. 18, 2016

Related U.S. Application Data

(63) Continuation of application No. PCT/JP2014/057487, filed on Mar. 19, 2014.

(30) Foreign Application Priority Data

Mar. 19, 2013   (JP) ................................ 2013-056631

(51) Int. Cl.
*C04B 37/02*     (2006.01)
*C04B 35/111*    (2006.01)
(Continued)

(52) U.S. Cl.
CPC ............ *C04B 37/026* (2013.01); *B23K 20/16* (2013.01); *B23K 20/22* (2013.01); *B23K 35/26* (2013.01);
(Continued)

(58) Field of Classification Search
None
See application file for complete search history.

(56) References Cited

U.S. PATENT DOCUMENTS

| 4,523,554 A | 6/1985 | Ryu |
| 5,139,191 A | 8/1992 | Velterop |

(Continued)

FOREIGN PATENT DOCUMENTS

| EP | 2 320 507 A1 | 5/2011 |
| JP | 61-11907 B2 | 4/1986 |

(Continued)

OTHER PUBLICATIONS

European Search Report, European Application No. 14769933.4, dated Oct. 10, 2016 (8 pages).

(Continued)

*Primary Examiner* — Seth Dumbris
(74) *Attorney, Agent, or Firm* — Burr & Brown, PLLC

(57) ABSTRACT

A joined body 20 includes a porous ceramic 22 made of porous ceramic, a metal member 24 made of a metal, and a joint 30 formed of an oxide ceramic that penetrates into pores 23 of the porous ceramic 22 and joins the porous ceramic 22 to the metal member 24. The penetration depth of the oxide ceramic into the pores of the porous ceramic is preferably 10 μm or more, and more preferably 15 to 50 μm. The joined body 20 may be produced through a joining step of forming a joint by placing a metal raw material between a porous ceramic and a metal member and firing the metal raw material in the air at a temperature in the range of 400° C. to 900° C., where an oxide ceramic produced by oxidation of the metal raw material penetrates into the pores of the porous ceramic in the joint.

21 Claims, 6 Drawing Sheets

(51) Int. Cl.
| | |
|---|---|
| C04B 35/12 | (2006.01) |
| C04B 35/565 | (2006.01) |
| C04B 35/573 | (2006.01) |
| C04B 37/00 | (2006.01) |
| C04B 38/00 | (2006.01) |
| C04B 35/01 | (2006.01) |
| C04B 35/26 | (2006.01) |
| C04B 35/45 | (2006.01) |
| B23K 20/16 | (2006.01) |
| B23K 20/22 | (2006.01) |
| B23K 35/26 | (2006.01) |
| B23K 35/28 | (2006.01) |
| B23K 35/32 | (2006.01) |
| B32B 3/12 | (2006.01) |
| B32B 7/04 | (2006.01) |
| B32B 9/00 | (2006.01) |
| B32B 15/04 | (2006.01) |
| B23K 103/16 | (2006.01) |
| B23K 103/00 | (2006.01) |
| B23K 103/08 | (2006.01) |
| B23K 103/14 | (2006.01) |
| B23K 103/18 | (2006.01) |
| B23K 103/02 | (2006.01) |
| B23K 103/12 | (2006.01) |

(52) U.S. Cl.
CPC ............ *B23K 35/262* (2013.01); *B23K 35/28* (2013.01); *B23K 35/32* (2013.01); *B23K 35/325* (2013.01); *B32B 3/12* (2013.01); *B32B 7/04* (2013.01); *B32B 9/005* (2013.01); *B32B 15/04* (2013.01); *C04B 35/01* (2013.01); *C04B 35/111* (2013.01); *C04B 35/12* (2013.01); *C04B 35/26* (2013.01); *C04B 35/45* (2013.01); *C04B 35/565* (2013.01); *C04B 35/573* (2013.01); *C04B 37/003* (2013.01); *C04B 37/005* (2013.01); *C04B 37/006* (2013.01); *C04B 37/023* (2013.01); *C04B 37/025* (2013.01); *C04B 38/0016* (2013.01); *B23K 2203/02* (2013.01); *B23K 2203/08* (2013.01); *B23K 2203/12* (2013.01); *B23K 2203/14* (2013.01); *B23K 2203/172* (2015.10); *B23K 2203/18* (2013.01); *B23K 2203/26* (2015.10); *B23K 2203/52* (2015.10); *B32B 2305/024* (2013.01); *C04B 2235/3227* (2013.01); *C04B 2237/06* (2013.01); *C04B 2237/123* (2013.01); *C04B 2237/124* (2013.01); *C04B 2237/34* (2013.01); *C04B 2237/343* (2013.01); *C04B 2237/365* (2013.01); *C04B 2237/597* (2013.01); *C04B 2237/61* (2013.01)

(56) References Cited

U.S. PATENT DOCUMENTS

| | | |
|---|---|---|
| 2003/0132270 A1 | 7/2003 | Weil et al. |
| 2010/0193104 A1 | 8/2010 | Ryu et al. |
| 2010/0196795 A1 | 8/2010 | Ohmori et al. |
| 2011/0052916 A1 | 3/2011 | Ohmori et al. |
| 2011/0111324 A1* | 5/2011 | Ohmori ............... H01M 8/2425 429/495 |

FOREIGN PATENT DOCUMENTS

| | | |
|---|---|---|
| JP | 62-4357 B2 | 1/1987 |
| JP | 63-51993 B2 | 10/1988 |
| JP | 04-300265 A1 | 10/1992 |
| JP | 10-272722 A1 | 10/1998 |
| JP | 2001-220252 A1 | 8/2001 |
| JP | 2003-173800 A1 | 6/2003 |
| JP | 2011-065975 A1 | 3/2011 |
| JP | 2011-108621 A1 | 6/2011 |
| JP | 2011-246340 A1 | 12/2011 |
| JP | 2012-076937 A1 | 4/2012 |

OTHER PUBLICATIONS

International Search Report and Written Opinion (Application No. PCT/JP2014/057487) dated Jun. 10, 2014.
International Preliminary Report on Patentability, International Application No. PCT/JP2014/057487, dated Oct. 1, 2015 (12 pages).
U.S. Appl. No. 14/856,629, filed Sep. 17, 2015, Izumi, et al.
U.S. Appl. No. 14/873,311, filed Oct. 2, 2015, Izumi, et al.
U.S. Appl. No. 14/876,327, filed Oct. 2, 2015, Izumi, et al.
U.S. Appl. No. 14/873,263, filed Oct. 2, 2015, Izumi, et al.
U.S. Appl. No. 14/873,291, filed Oct. 2, 2015, Izumi, et al.

* cited by examiner

JOINED BODY AND METHOD FOR PRODUCING THE SAME

BACKGROUND ART

1. Field of the Invention

The present invention relates to a joined body and a method for producing the joined body.

2. Description of the Related Art

A metal-ceramic joined body that includes a pair of electrodes, which are formed of a metal layer, on a surface of a porous ceramic honeycomb body is proposed (see, for example, Patent Literature 1). In this joined body, the metal layers contain Cr and Fe, and a diffusion layer formed of a metal silicide is disposed within a boundary between the honeycomb body and the metal layers and ensures reliability of an electrical junction in high-temperature environments. A joined body produced by compressing and firing a mixture of titanium dihydrate and silicon dioxide applied to a bonding region between a porous ceramic and stainless steel at 1200° C. or more is proposed (see, for example, Patent Literature 2). In this joined body, silicon dioxide is reduced by titanium dihydrate, and the porous ceramic is joined to the stainless steel with metallic titanium and metallic silicon. A joined body produced by joining a porous ceramic having pores filled with ceramic to a metal part with brazing filler containing an active metal is proposed (see, for example, Patent Literature 3). In this joined body, the porous ceramic is joined to the metal part with Ag—Cu eutectic. A joined body produced by joining a superalloy substrate for use in gas turbine blades to a ceramic thermal barrier layer formed of stabilized zirconia with a metal-ceramic graded composition structure layer containing Pt, Ir, Au, and the like is proposed (see, for example, Patent Literature 4). In this joined body, use of oxidation-resistant noble metals in the joining layer reduces the volume expansion of the metal due to oxidation and prevents the superalloy substrate from separating from the ceramic layer.

CITATION LIST

Patent Literature

PTL 1: JP 2011-246340 A
PTL 2: JP 4-300265 A
PTL 3: JP 2001-220252 A
PTL 4: JP 10-272722 A

SUMMARY OF THE INVENTION

However, because the joined bodies described in Patent Literature 1 to Patent Literature 3 have a metallic joining layer, the joined bodies have problems of low heat resistance, low oxidation resistance, and low joining reliability. In Patent Literature 1 and Patent Literature 2, there are problems of high firing temperature and high energy consumption. In Patent Literature 4, there are problems in that not much consideration has been given to joining of porous ceramics, it is desirable to use abundant materials other than noble metals, and joining is performed by an inconvenient method, such as atmospheric plasma spraying. Thus, there is a demand for more simple and more reliable joining of a porous ceramic to a metal member.

In view of such problems, it is a principal objective of the present invention to provide a joined body that can be produced by more simply and more reliably joining a porous ceramic to a metal member and a method for producing the joined body.

On the basis of extensive studies to achieve the principal objective, the present inventors completed the present invention by finding that a porous ceramic can be more simply and more reliably joined to a metal member with a joint formed of an oxide ceramic of a metal oxide.

A joined body according to the present invention includes
a porous ceramic,
a metal member, and
a joint of an oxide ceramic that penetrates into pores of the porous ceramic and joins the porous ceramic to the metal member.

A method for producing a joined body according to the present invention is
a method for producing a joined body of a porous ceramic and a metal member joined together. The method includes
a joining step of forming a joint by placing a metal raw material between the porous ceramic and the metal member and firing the metal raw material in an oxidizing atmosphere at a temperature in the range of 400° C. to 900° C., wherein an oxide ceramic produced by oxidation of the metal raw material penetrates into pores of the porous ceramic.

The present invention can more simply and more reliably join a porous ceramic to a metal member. The following is a plausible reason for this. For example, the joint is the oxide ceramic and is therefore stable at high temperatures and in oxygen atmospheres. A relatively dense oxide ceramic penetrates into the pores of the porous ceramic and strongly combines a joining layer with the porous ceramic. Thus, it is surmised that the porous ceramic can be more simply and more reliably joined to the metal member.

DESCRIPTION OF THE PREFERRED EMBODIMENTS

Figure 1:
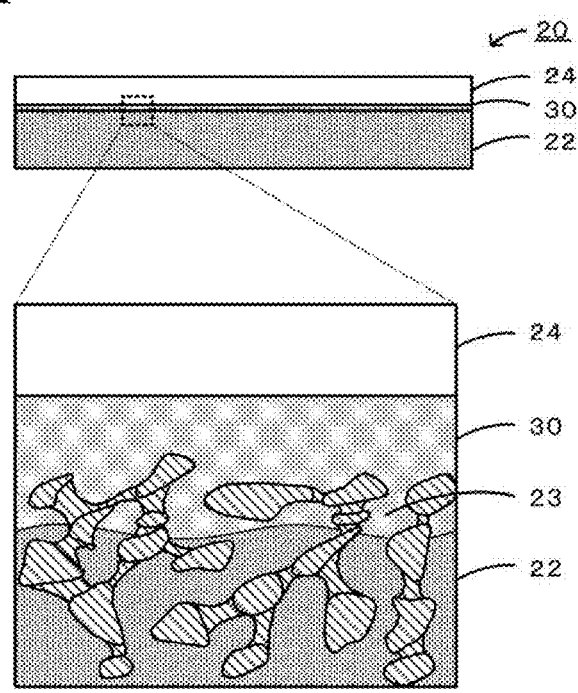
FIG. 1 is a schematic explanatory view of the structure of a joined body 20 according to an embodiment of the present invention.
Figure 2:
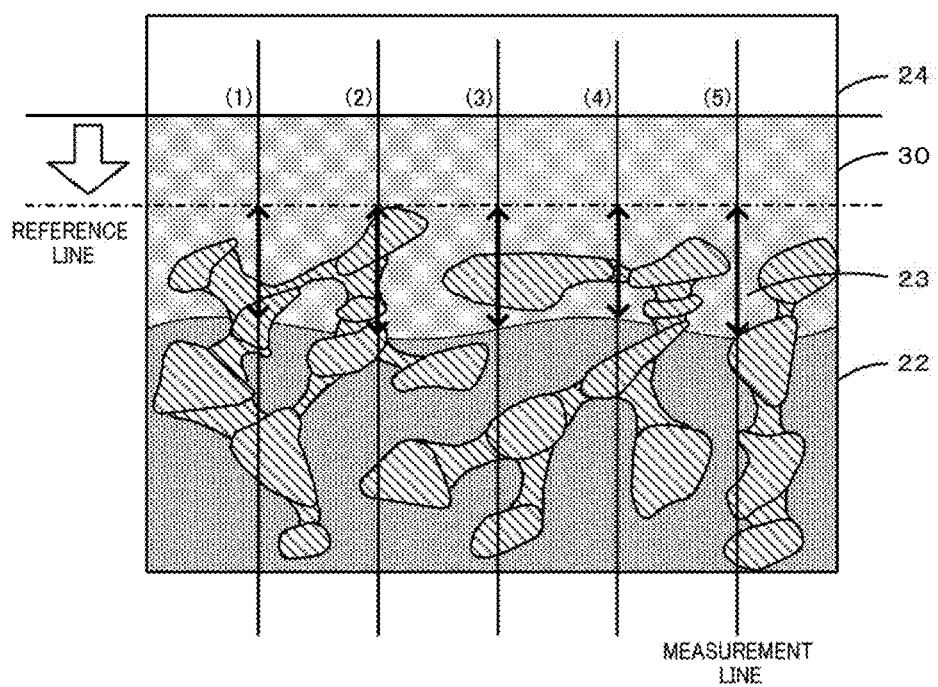
FIG. 2 is an explanatory view of the penetration depth of an oxide ceramic in a porous ceramic.

Embodiments of the present invention will be described below with reference to the accompanying drawings. FIG. 1 is a schematic explanatory view of the structure of a joined body 20 according to an embodiment of the present invention. FIG. 2 is an explanatory view of a method for measuring the penetration depth of an oxide ceramic in a porous ceramic. As illustrated in FIG. 1, a joined body 20 according to the present invention includes a porous ceramic 22 made of porous ceramic, a metal member 24 made of a metal, and a joint 30 formed of an oxide ceramic that penetrates into pores 23 of the porous ceramic 22 and joins the porous ceramic 22 to the metal member 24. A joined body according to the present invention will be described in detail below.

A porous ceramic according to the present invention may be any porous ceramic. The term "porous", as used herein, means that there are open pores on the surface. For example, the porosity may be 10% or more by volume, preferably 20% or more by volume, more preferably 40% or more by volume. The porosity is preferably 90% or less by volume in terms of simplicity of production. The porosity of the porous ceramic can be appropriately determined for each use. The porous ceramic preferably has an average pore size in the range of 1 to 300 μm, for example. In this range, oxide ceramic can easily penetrate into the pores of the porous ceramic. The average pore size is more preferably 5 μm or more, still more preferably 10 μm or more. The average pore size is more preferably 100 μm or less, still more preferably 50 μm or less. The porosity and the average pore size of the porous ceramic are measured by a mercury intrusion method.

For example, the porous ceramic may contain at least one inorganic material selected from cordierite, silicon carbide (SiC), mullite, zeolite, aluminum titanate, aluminum oxide (alumina), silicon nitride, sialon, zirconium phosphate, zirconium oxide (zirconia), titanium oxide (titania), silicon oxide (silica), and magnesium oxide (magnesia). The porous ceramic may be at least one of carbide, nitride, and silicide. More specifically, for example, the porous ceramic may be a porous body of at least one of TiC, $B_4C$, $Si_3N_4$, AlN, TiN, and $MoSi_2$. The shape of the porous ceramic is not particularly limited and may be determined for each use, for example, plate-like, cylindrical, or honeycomb, or may be of a structure through which a fluid can flow. More specifically, the porous ceramic is preferably a honeycomb structure having partition walls forming a plurality of cells serving as a fluid flow path. The porous ceramic may be electrically conductive when the metal member is an electrode. In this case, the porous ceramic is preferably a composite material containing SiC and Si for bonding SiC, the SiC and the Si forming pores. Si-bonded SiC ceramics are sometimes joined to a metal member serving as an electrode in order to provide electric conductivity. Thus, the application of the present invention has great significance. The term "electrically conductive", as used herein, refers to an electrical conductivity of $10^{-6}$ S/cm or more. The term "electrically non-conductive", as used herein, refers to an electrical conductivity of less than $10^{-6}$ S/cm, for example.

A metal member according to the present invention is used in combination with a porous ceramic. The metal member may be made of any metal, such as a typical metal or transition metal, and is preferably electrically conductive, for example. The transition metal is preferably a metal such as Fe, Co, Ni, or Cu or an alloy thereof. Depending on the use, a noble metal, such as Pt or Au, may be used. The metal member may be an electrode. In this case, stainless steel, such as a Cr—Ni—Fe alloy or Cr—Fe alloy, is suitably used. The metal member is preferably an alloy containing at least Fe and Cr and is more preferably an alloy in which Fe constitutes 70% or more by mass and less than 90% by mass and Cr constitutes 10% or more by mass and less than 30% by mass. This is because of their stable material quality and high electrical conductivity. The metal member may have any shape, such as plate-like, depending on the use.

A joint according to the present invention is an oxide ceramic that penetrates into pores of a porous ceramic and joins the porous ceramic to a metal member. The depth of the oxide ceramic in the pores of the porous ceramic (penetration depth) is preferably 10 μm or more. This is because of its high joining strength. The penetration depth is more preferably 15 μm or more, still more preferably 20 μm or more. The penetration depth is preferably 50 μm or less. A method for measuring the penetration depth will be described below. As illustrated in FIG. 2, a cross section in which the porous ceramic 22, the metal member 24, and the joint 30 (oxide ceramic) can be simultaneously observed is mirror-polished. The polished surface is observed with an electron microscope (SEM) at a magnification of 200, and microstructure photographs are taken. In a photograph image thus taken, a line parallel to the lower end line of the metal member 24 is drawn in contact with the uppermost portion of the porous ceramic. This line is taken as a reference line (a dash-dot line in FIG. 2) located at a penetration depth of 0. The reference line is divided into six equal parts, and five straight lines perpendicular to the six equal parts are drawn as measurement lines (lines (1) to (5) in FIG. 2). A point of intersection between the reference line and each of the measurement lines is taken as a starting point. A point of intersection between the lower end of the oxide ceramic and each of the measurement lines is taken as an end point. The length between the starting point and the end point is measured for the five measurement lines. The five lengths are corrected for the magnification and are averaged to determine the penetration depth.

In a joint according to the present invention, the ratio B/A of the average particle size B (μm) of the raw material powder of the oxide ceramic to the average pore size A (μm) of the porous ceramic is preferably 0.1 or more. B/A is preferably 5.0 or less. This range is preferred because raw material particles in the joint can easily penetrate into pores of a substrate when fired. B/A is more preferably 0.3 or more. B/A is more preferably 3.0 or less. The average particle size of the raw material powder is the median size (D50) measured with a laser diffraction/scattering particle size distribution analyzer using water as a dispersion medium.

A joint according to the present invention is preferably formed by mixing a plurality of raw material powders having different particle sizes. This can further increase the joining strength of the joint. For example, the joint may be formed by mixing a first raw material powder having an average particle size (μm) smaller than or equal to the average pore size A (μm) of the porous ceramic and a second raw material powder having an average particle size (μm) greater than the average pore size A. For example, the average particle size (μm) of the first raw material powder is preferably not more than the half, more preferably not more than one-third, of the average pore size A (μm). For example, the average particle size (μm) of the second raw material powder is preferably at least twice, more preferably at least three times, the average pore size A. The first raw material powder is preferred in order to penetrate into the pores of the porous ceramic, and the second raw material powder is preferred in order to improve the strength of the joint itself. The amount of the first raw material powder is preferably greater than the amount of the second raw material powder. For example, the amount of the first raw material powder is preferably 20% or more by volume, more preferably 35% or more by volume. The joint may be formed using only a first raw material powder having an average particle size smaller than or equal to the average pore size A of the porous ceramic.

In a joint according to the present invention, a reaction layer at the interface between the porous ceramic and the oxide ceramic is preferably 0.1 μm or less. In joining treatment of joining the porous ceramic to the metal member with a joint, heating may cause a reaction between the porous ceramic and the oxide ceramic (and/or its raw material) and form a composite phase. A reaction layer containing such a composite phase is preferably minimized and more preferably does not exist.

A joint according to the present invention includes a penetrating portion in which the oxide ceramic penetrates into pores and a non-penetrating portion other than the penetrating portion, and the non-penetrating portion preferably has a porosity of 60% or less by volume, more preferably 50% or less by volume, still more preferably 30% or less by volume. The oxide ceramic is still more preferably a dense body in terms of joining strength. The lower limit of the porosity is 0% by volume. The porosity of the oxide ceramic in the penetrating portion that penetrates into the pores of the porous ceramic is preferably 50% or less by volume. The oxide ceramic that penetrates into the porous ceramic is more preferably denser than the other portion of the joint in terms of joining strength. The porosity of the oxide ceramic that penetrates into the pores of the porous ceramic is more preferably 30% or less by volume, still more preferably 20% or less by volume. The lower limit of the porosity is 0% by volume. The porosity of the oxide ceramic is calculated by the following method. The porosity of the oxide ceramic is determined by image analysis of a microstructure photograph image taken with a SEM as described above using image analysis software. In a non-penetrating portion of the joint in which the oxide ceramic does not penetrate into the pores, a portion having an area of $0.5 \times 10^{-6}$ $m^2$ in the joint is chosen in the microstructure photograph and is subjected to binarization treatment to distinguish the pore images from the oxide ceramic image. The conditions for the binarization treatment are appropriately determined for each image and may be empirically determined. In the image subjected to the binarization treatment, the oxide ceramic is separated from the pores, and their area ratio is calculated as the porosity. The area ratio in the cross section is assumed to correspond substantially to the volume ratio and is considered to be the porosity (% by volume). In a penetrating portion of the joint in which the oxide ceramic penetrates into the pores, a region having a total area of $1.5 \times 10^{-8}$ $m^2$ between the reference line and the porous ceramic is chosen in the microstructure photograph and is subjected to binarization treatment to distinguish the pore images from the oxide ceramic image. In the image subjected to the binarization treatment, in the same manner as in the non-penetrating portion, the oxide ceramic is separated from the pores, and their area ratio is calculated as the porosity.

A joint according to the present invention may be formed using a pore-forming material. The pore-forming material can preferably be eliminated by treatment. For example, the pore-forming material may be at least one selected from the group consisting of carbon black, coke, starch, refined rice flour, natural resins, and synthetic resins, which can be burned by heat treatment. For example, the amount of pore-forming material in the joint is preferably 10% or more by volume, more preferably 20% or more by volume. The pore-forming material preferably constitutes 10% or more by volume because this promotes stress relaxation in the joint. The amount of pore-forming material in the joint is preferably 50% or less by volume, more preferably 30% or less by volume. The pore-forming material preferably constitutes 50% or less by volume because this can further suppress a decrease in mechanical strength in the joint. The amount of pore-forming material in the joint is preferably appropriately determined on the basis of the relationship between the degree of stress relaxation and mechanical strength in the joint.

In a joint according to the present invention, the raw material of the oxide ceramic is preferably a metal, carbide, or nitride having a volume change ratio Y/X of 0.7 or more. The volume change ratio Y/X is the ratio of the volume Y after oxidation to the volume X before the oxidation. The raw material powder may contain an oxide. The volume change ratio Y/X is more preferably 1.3 or more, still more preferably 1.6 or more. This is because as the volume change ratio increases the oxide ceramic more easily penetrates into the pores of the porous ceramic due to oxidative expansion. For example, the volume change ratio Y/X is 2.14 for $Fe_2O_3/Fe$, 1.77 for CuO/Cu, 2.22 for $Mn_2O_3/Mn$, 1.62 for NiO/Ni, 0.79 for MgO/Mg, and 1.28 for $Al_2O_3/Al$.

In a joint according to the present invention, the oxide ceramic is preferably a metal oxide. The metal may be a typical metal or transition metal but is not a noble metal, which rarely forms an oxide. The oxide ceramic preferably contains at least one selected from Fe, Ni, Mn, Cu, Ti, V, Mg, and Al, more preferably Fe, Ni, Mn, and/or Cu. Depending on the use, the oxide ceramic may be electrically conductive or electrically non-conductive. For example, when the metal member is only fixed to the porous ceramic, the oxide ceramic may be electrically non-conductive. When the metal member is joined as an electrode to the electrically conductive porous ceramic, the oxide ceramic is electrically conductive.

In a joint according to the present invention, the oxide ceramic preferably contains a secondary component in addition to a primary component. The primary component is a main component and is a metallic element. The secondary component is a metallic element. The joint preferably contains the secondary component because a solid solution of a compound containing the secondary component (hereinafter also referred to as a secondary compound) in an oxide of the primary component of the oxide ceramic (hereinafter also referred to as a main oxide) can provide additional electrical conductivity and further suppress a decrease in electrical conductivity under heating. The joint preferably contains the secondary component also because this can further reduce the electrical resistance of the joint and suppress heat generation. The secondary compound may be a conductive aid. For example, the secondary component is preferably a metallic element having a different valence from the primary component of the oxide ceramic, or may be the same metal as the primary component, or may be a different metal from the primary component. For example, the secondary component is preferably at least one element of Li, Na, K, Ga, Si, Zr, Ti, Sn, Nb, Sb, and Ta. The secondary compound containing the secondary component may be a carbonate, oxide, hydroxide, chloride, or nitrate, or may be a carbonate or oxide. For example, the secondary component content is preferably 0.2 mol % or more, more preferably 0.5 mol % or more, still more preferably 1.0 mol % or more, based on the number of moles of the elements of the joint. The content is preferably 50 mol % or less, more preferably 30 mol % or less, still more preferably 15 mol % or less. More specifically, when the main oxide of the oxide ceramic is $Fe_2O_3$, the secondary compound may contain the same element as in $Fe_3O_4$ or FeO or a different element as in $TiO_2$, $SnO_2$, $Nb_2O_5$, $SiO_2$, or $ZrO_2$. When the main oxide is CuO or NiO, the secondary compound may be $Li_2CO_3$, $Na_2CO_3$, or $K_2CO_3$. The term "main oxide", as used herein, refers to an oxide highest in amount among the constituent compounds of the joint and may be an oxide constituting 40 mol % or more of the joint, an oxide constituting 50 mol % or more of the joint, or an oxide constituting 70 mol % or more of the joint.

A joined body according to the present invention preferably has high capability of joining the porous ceramic and the metal member together. The term "high capability of joining", as used herein, means that no separation is observed at the interface between the porous ceramic, the metal member, and the oxide ceramic of the joint, or no cracks are observed in the porous ceramic, the metal member, and the oxide ceramic of the joint. A method for evaluating joining capability will be described below. An observation sample is prepared by embedding a joined body according to the present invention in a resin and mirror-polishing the joined body with diamond slurry or the like. The sample is then inspected with a scanning electron microscope (SEM) at a magnification of 1500 or more for separation between the porous ceramic, the metal member, and the joint, and for cracks in the porous ceramic, the metal member, and the joint. The capability of joining the porous ceramic and the metal member together can be evaluated on the basis of the inspection results.

A joined body according to the present invention preferably has a joining strength of 1.5 MPa or more between the porous ceramic and the metal member. The joining strength is more preferably 3.0 MPa or more, still more preferably 5.0 MPa or more. Although higher joining strength is preferred because of stronger joining and higher reliability, the upper limit is approximately 500 MPa in terms of material composition.

A joined body according to the present invention in which a metal member serving as an electrode is joined to an electrically conductive porous ceramic preferably has an electrical conductivity of $10^{-6}$ S/cm or more, more preferably $10^{-3}$ S/cm or more, still more preferably $10^{-2}$ S/cm or more. Although a higher electrical conductivity results in a joined body having higher electrical conductivity and more efficient electric utilization, the upper limit is approximately $10^3$ S/cm in terms of material composition. The electrical conductivity is measured by a two-terminal method in a sample prepared by baking a Ag paste as an electrode on a joined body processed or formed into a disk having a diameter of 15 mm.

A joined body according to the present invention may be produced through a joining step of forming a joint by placing a metal raw material between a porous ceramic and a metal member and firing the metal raw material in an oxidizing atmosphere (for example, in the air) at a temperature in the range of 400° C. to 900° C., wherein an oxide ceramic produced by oxidation of the metal raw material penetrates into the pores of the porous ceramic in the joint. The joining temperature in the firing is in a suitable range depending on the material of the joint and is more preferably 500° C. or more, still more preferably 600° C. or more. The joining temperature is more preferably 850° C. or less, still more preferably 800° C. or less. The joining temperature is preferably as high as possible in terms of sufficient oxidation and is preferably as low as possible in terms of energy consumption. In a joined body according to the present invention, the joint may be formed from a metal raw material having an average particle size in the range of 1 to 40 μm. In this range, oxide ceramic can easily penetrate into the pores of the porous ceramic. The raw material of the joint preferably has an average particle size of 30 μm or less, more preferably 10 μm or less, still more preferably 5 μm or less. The average particle size is preferably 3 μm or more. The average particle size of the raw material particles is the median size (D50) measured with a laser diffraction/scattering particle size distribution analyzer using water as a dispersion medium. In a joined body according to the present invention, the joint may be formed from a metal, carbide, or nitride raw material having a volume change ratio Y/X of 0.7 or more. The volume change ratio Y/X is the ratio of the volume Y after oxidation to the volume X before the oxidation. The joint is preferably formed from a metal raw material. In particular, the joint may be formed from a metal raw material having a volume change ratio Y/X of 1.3 or more, preferably 1.6 or more. The raw material powder may contain an oxide.

Figure 3:
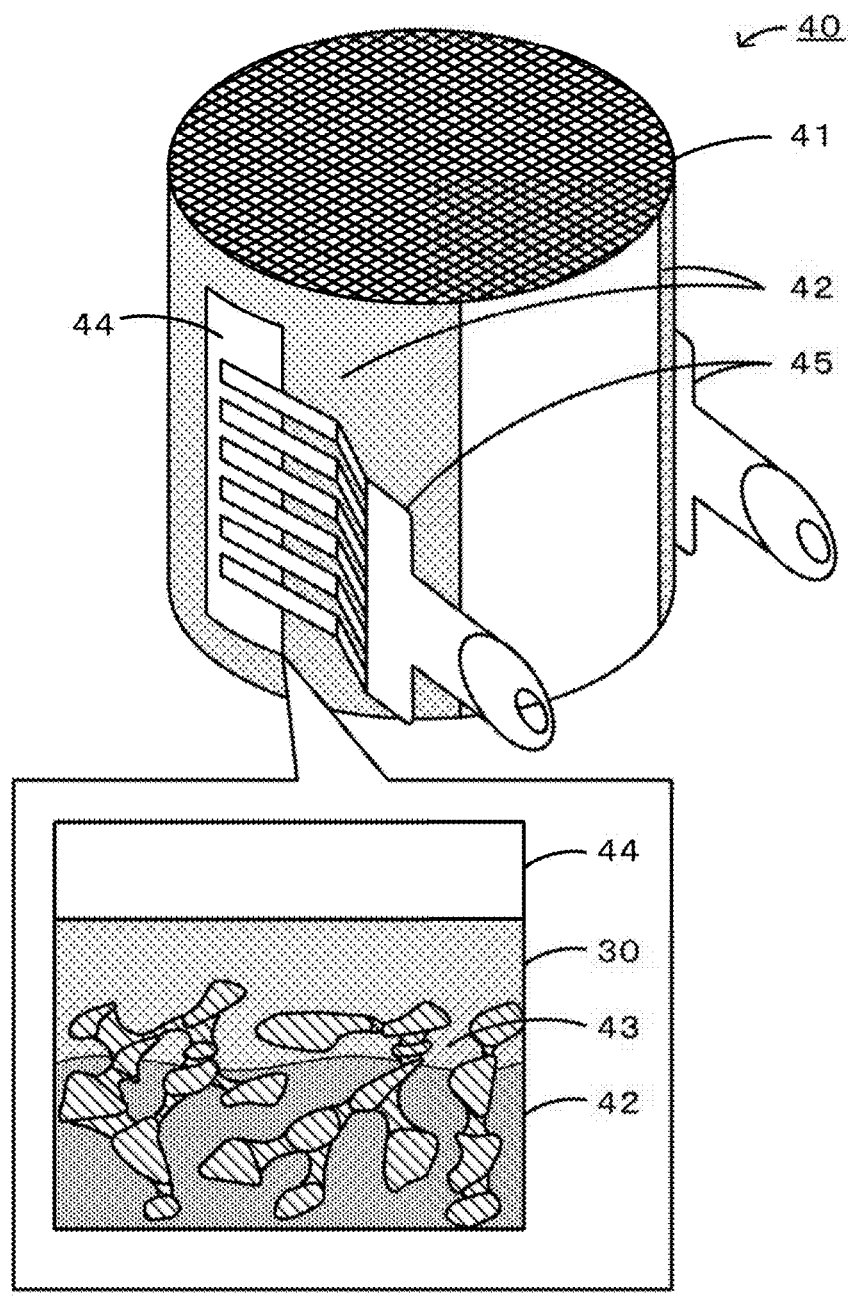
FIG. 3 is an explanatory view of a honeycomb structure 40, which is an example of the joined body 20.

A joined body according to the present invention may have any structure in which a porous ceramic and a metal member are joined together, and can be used in honeycomb structures, thermoelectric elements, ceramic heaters, and oxygen and NOx gas sensors, for example. For example, in honeycomb structures, a joined body according to the present invention is suitably used to heat a honeycomb structure by the application of a voltage to the metal member. FIG. 3 is an explanatory view of a honeycomb structure 40, which is an example of the joined body 20. The honeycomb structure 40 is configured to heat a honeycomb substrate 41 by the application of a voltage to electrode terminals 45. The honeycomb structure 40 includes the honeycomb substrate 41, an electrically conductive porous portion 42 corresponding to the porous ceramic 22 and having higher electrical conductivity than the honeycomb substrate 41, a metal electrode 44 corresponding to the metal member 24 and joined to the electrically conductive porous portion 42, and an electrode terminal 45 connected to the metal electrode 44. Like the joined body 20 illustrated above in FIG. 1, a joint 30 is an oxide ceramic that penetrates into pores 43 of the electrically conductive porous portion 42 and joins the electrically conductive porous portion 42 to the metal electrode 44. For example, the joint 30 may be an electrically conductive metal oxide. The difference in electrical conductivity between the honeycomb substrate 41 and the electrically conductive porous portion 42 may result from different metal contents, for example. For example, when the honeycomb structure is formed of a Si-bonded SiC ceramic, the electrically conductive porous portion 42 may have a higher Si content.

A method for producing a joined body according to the present invention will be described below. For example, a method for producing a joined body according to the present invention may include a substrate production step of producing a porous ceramic and a joining step of forming a joint by placing a metal raw material between the porous ceramic and a metal member and firing the metal raw material in an oxidizing atmosphere at a temperature in the range of 400° C. to 900° C., wherein an oxide ceramic produced by oxidation of the metal raw material penetrates into the pores of the porous ceramic in the joint. The substrate production step may be omitted by separately preparing the porous ceramic.

Substrate Production Step

In this step, for example, a porous ceramic (substrate) may be produced by mixing the raw materials of the porous ceramic, forming the raw materials by a predetermined forming method, and firing the formed product. For example, the porous ceramic may contain at least one inorganic material selected from cordierite, silicon carbide (SiC), mullite, zeolite, aluminum titanate, aluminum oxide (alumina), silicon nitride, sialon, zirconium phosphate, zirconium oxide (zirconia), titanium oxide (titania), silicon oxide (silica), and magnesium oxide (magnesia). The porous ceramic may be at least one of carbide, nitride, and silicide. More specifically, for example, the porous ceramic may be a porous body of at least one of TiC, $B_4C$, $Si_3N_4$, AlN, TiN, and $MoSi_2$. In this step, for example, an aggregate of an inorganic material, a pore-forming material, and a dispersion medium may be mixed to adjust a pug or slurry. The raw material mixture is preferably prepared such that the porosity and average pore size of the porous ceramic are in the ranges described above; for example, the porosity is 10% or more by volume, and the average pore size ranges from 1 to 300 μm.

The substrate production step, for example, in the production of a Si-bonded SiC ceramic (composite material) will be more specifically described. In this case, for example, a plastic pug can be formed by mixing a SiC powder and a Si powder at a predetermined volume ratio and mixing the mixture with a dispersion medium, such as water, a pore-forming material, and an organic binder. The pore-forming material is preferably one that can be burned by subsequent firing, for example, starch, coke, or foamable resin. The binder is preferably an organic binder, such as cellulose. A surfactant, such as ethylene glycol, may be used as a dispersant. For example, the porous ceramic may be formed as a honeycomb formed product in the shape described above by extrusion using a die with which an array of cells can be formed. The honeycomb formed product is preferably dried, calcined, and fired. In calcination, the organic components in the honeycomb formed product are removed by combustion at a temperature lower than the firing temperature. The firing temperature may range from 1400° C. to 1500° C., preferably 1430° C. to 1450° C. The firing atmosphere is preferably, but not limited to, an inert atmosphere, more preferably an Ar atmosphere. A honeycomb substrate (Si-bonded SiC ceramic) formed of a sintered body can be produced through these steps.

Joining Step

In this step, a porous ceramic is joined to a metal member with a joint by joining treatment. The metal member may be formed of the material described above, for example, a metal such as Fe, Co, Ni, or Cu or an alloy thereof. The metal member is preferably formed of an alloy containing at least Fe and Cr and is more preferably formed of an alloy in which Fe constitutes 70% or more by mass and less than 90% by mass and Cr constitutes 10% or more by mass and less than 30% by mass. This is because of their stable material quality and high electrical conductivity. For example, the metal member may be a plate. The material for use in the joint is preferably a material that is oxidized in an oxidizing atmosphere, is more stable in its oxide form, and generates heat and expands during oxidation, for example, a metal powder, carbide, or nitride. The material is preferably oxidized to oxide ceramic. Metal oxide powders are not suitable as raw materials for the joint because oxide ceramic insufficiently penetrates into the pores of the porous ceramic even after heat treatment. For example, the metal powder preferably has an average particle size in the range of 1 to 40 μm. In this range, oxide ceramic can easily penetrate into the pores of the porous ceramic. The raw material of the joint preferably has an average particle size of 30 μm or less, more preferably 10 μm or less, still more preferably 5 μm or less. The average particle size is more preferably 3 μm or more. In this joining step, a raw material of the oxide ceramic satisfying B/A of 0.1 or more is preferably used, wherein the average pore size of the porous ceramic is A (μm), and the average particle size of the raw material powder of the oxide ceramic is B (μm). A raw material having B/A of 5.0 or less is preferably used. This range is preferred because raw material particles in the joint can easily penetrate into the pores of the substrate when fired. B/A is more preferably 0.3 or more. B/A is more preferably 3.0 or less. For example, the metal powder is preferably a metal, carbide, or nitride having a volume change ratio of 0.7 or more, more preferably 1.3 or more, still more preferably 1.6 or more. In particular, one having a volume change ratio of 1.3 or more is preferred because, due to oxidative expansion during firing, oxide ceramic sufficiently penetrates into the pores of the porous ceramic, resulting in greater joining strength. The raw material powder may contain an oxide.

In this step, a plurality of raw material powders having different particle sizes are preferably mixed to prepare the raw material powder of the joint. This can further increase the joining strength of the joint. For example, a first raw material powder having an average particle size (μm) smaller than or equal to the average pore size A (μm) of the porous ceramic may be mixed with a second raw material powder having an average particle size (μm) greater than the average pore size A. For example, the average particle size (μm) of the first raw material powder is preferably not more than the half, more preferably not more than one-third, of the average pore size A (μm). For example, the average particle size (μm) of the second raw material powder is preferably at least twice, more preferably at least three times, the average pore size A. The first raw material powder is preferred in order to penetrate into the pores of the porous ceramic, and the second raw material powder is preferred in order to improve the strength of the joint itself. The amount of the first raw material powder is preferably greater than the amount of the second raw material powder. For example, the amount of the first raw material powder is preferably 20% or more by volume, more preferably 35% or more by volume. The raw material powder of the joint may be only a first raw material powder having an average particle size smaller than or equal to the average pore size A of the porous ceramic.

In this step, in addition to a primary component, which is a main component and is a metal, a compound containing a secondary component (secondary compound) is preferably added to the raw material powder of the joint. The secondary component is a metallic element. The secondary compound may be a conductive aid. The addition of the secondary compound to the joint is preferred because a solid solution of the secondary compound in the main oxide of the oxide ceramic can provide additional electrical conductivity and further suppress a decrease in electrical conductivity under heating. The addition of the secondary compound to the joint is also preferred because this can further reduce the electrical resistance of the joint and suppress heat generation. For example, the secondary compound is preferably a compound containing a metallic element having a valence different from the valence of the main oxide, or may contain the same metal as the main oxide, or may contain a different metal from the main oxide. For example, the secondary compound preferably contains at least one element of Li, Na, K, Ga, Si, Zr, Ti, Sn, Nb, Sb, and Ta. The secondary compound may be a carbonate or oxide. For example, the amount of secondary compound to be added is preferably 0.2 mol % or more, more preferably 0.5 mol % or more, still more preferably 1.0 mol % or more, based on the number of moles of all the elements of the joint. The content is preferably 50 mol % or less, more preferably 30 mol % or less, still more preferably 15 mol % or less. More specifically, when the main oxide of the oxide ceramic is $Fe_2O_3$, the secondary compound may contain the same element as in $Fe_3O_4$ or FeO or a different element as in $TiO_2$, $SnO_2$, $Nb_2O_5$, $SiO_2$, or $ZrO_2$. When the main oxide is CuO or NiO, the secondary compound may be $Li_2CO_3$, $Na_2CO_3$, or $K_2CO_3$.

In this step, the metal raw material is preferably fired while the metal member is restricted in its movements. This can prevent misalignment of the metal member. Furthermore, the metal member can be more securely joined to the joint. The phrase "restricted in its movements" means that the metal member may be fixed with a weight, for example, with a holding jig. Although the porous ceramic and the metal member can be fixed by positive pressurization, such treatment is preferably omitted in order to simplify the production process. Joining treatment can be performed in an oxidizing atmosphere (in the air), for example. The oxidizing atmosphere may be an atmosphere containing oxygen or may be the air or a gas in which oxygen, an inert gas, or water vapor is added to the air. The joining temperature (firing temperature) preferably ranges from 400° C. to 900° C. In this temperature range, the metal raw material can be oxidized to oxide ceramic. The joining temperature is in a suitable range depending on the material of the joint and is more preferably 500° C. or more, still more preferably 600° C. or more. The joining temperature is more preferably 850° C. or less, still more preferably 800° C. or less. The joining temperature is preferably as high as possible in terms of sufficient oxidization and is preferably as low as possible in terms of energy consumption. Thus, joining treatment can be performed in a simple atmosphere, that is, in an oxidizing atmosphere (in the air) and at low temperatures of 900° C. or less. In this step, firing is preferably performed such that the porosity of the oxide ceramic in the non-penetrating portion in which the oxide ceramic does not penetrate into the pores is 60% or less by volume, more preferably 50% or less by volume, still more preferably 30% or less by volume. The oxide ceramic is still more preferably a dense body in terms of joining strength. The lower limit of the porosity is 0% by volume. Firing is also preferably performed such that the porosity of the oxide ceramic that penetrates into the pores of the porous ceramic in the penetrating portion is 50% or less by volume, more preferably 30% or less by volume, still more preferably 20% or less by volume. The oxide ceramic that penetrates into the porous ceramic is more preferably denser than the other portion of the joint in terms of joining strength.

In this step, a pore-forming material may be added to the raw material powder of the joint. For example, the amount of pore-forming material in the joint is preferably 10% or more by volume, more preferably 20% or more by volume. The pore-forming material preferably constitutes 10% or more by volume because this promotes stress relaxation in the joint. This amount is preferably 50% or less by volume, more preferably 30% or less by volume. The pore-forming material preferably constitutes 50% or less by volume because this can further suppress a decrease in mechanical strength in the joint. The amount of pore-forming material in the joint may be appropriately determined on the basis of the relationship between the degree of stress relaxation and mechanical strength in the joint.

Figure 4A:
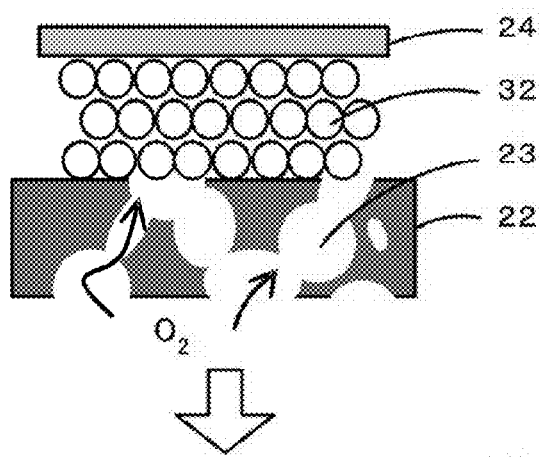
FIGS. 4A-4D are schematic views of a joining process for a joined body.
Figure 4B:
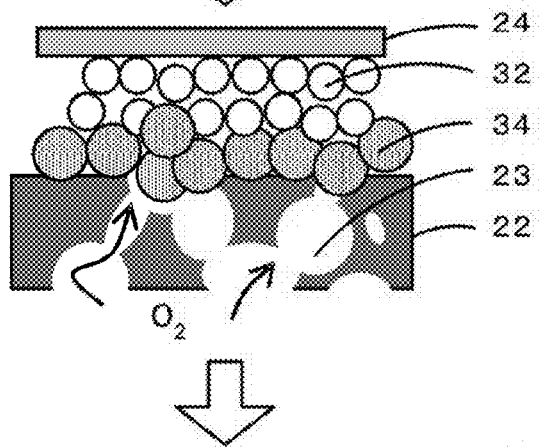
Figure 4C:
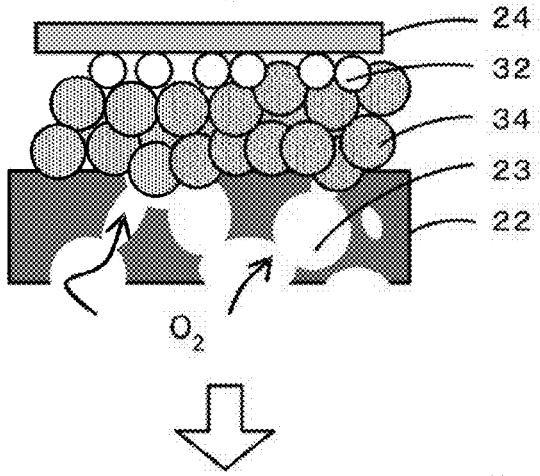
Figure 4D:
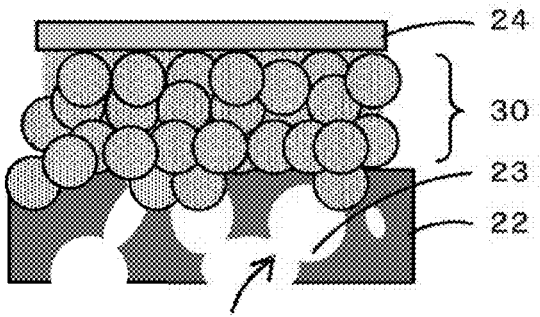

The joining step will be described below. FIGS. 4A-4D are schematic views of a joining process for a joined body. As illustrated in FIG. 4A, metal particles 32 are placed between a porous ceramic 22 and a metal member 24 and are heated in an oxidizing atmosphere (in the air), for example. As illustrated in FIG. 4B, the metal particles 32 are gradually oxidized to metal oxide 34 by oxygen passing through pores 23 and the like. The metal oxide 34 having an increased volume due to a change in density caused by oxidation penetrates into the pores 23. As illustrated in FIG. 4C, as oxidation proceeds, internal metal particles 32 are oxidized to the metal oxide 34 and push the metal oxide 34 into the pores 23 of the porous ceramic 22. As illustrated in FIG. 4D, while moving by sintering, the metal oxide 34 further penetrates into the pores 23. As a result, the joint 30 made of the metal oxide 34 (oxide ceramic) is formed. Thus, it is surmised that the metal oxide 34 penetrates into the pores 23 of the porous ceramic 22 when fired in the joining step.

In the joined body according to the present embodiment and the method for producing the joined body described above, the joint formed of oxide ceramic is stable even at high temperatures and in an oxygen atmosphere. A relatively dense oxide ceramic penetrates into the pores of the porous ceramic and strongly combines a joining layer with the porous ceramic. Thus, the porous ceramic can be more simply and more reliably joined to the metal member.

The present invention should not be limited to the embodiments described above and can be implemented in various aspects within the scope of the present invention.

EXAMPLES

Specific experimental examples of the production of a joined body will be described below. Experimental Examples 1 to 14, 18 to 39, and 41 to 49 correspond to examples of the present invention. Experimental Examples 15 to 17 and 40 correspond to comparative examples.

Production of Porous Ceramic

A Si-bonded SiC fired product and an alumina fired product were produced as porous ceramics. A "mixed powder" was prepared as a raw material for the porous ceramic of the Si-bonded SiC fired product by mixing a SiC powder and a metallic Si powder at a volume ratio of 38:22. A binder hydroxypropylmethylcellulose, a pore-forming material starch, a water-absorbing resin, and water were added to the "mixed powder" to prepare a raw material for a porous material (a forming raw material). The forming raw material was kneaded and formed into a cylindrical pug. The cylindrical pug was extruded from an extruder to form a honeycomb formed product. The formed product was dried at 120° C. in the air to produce a dried product. The dried product was degreased at 450° C. in the air and was then fired at 1450° C. for 2 hours in an Ar atmosphere at normal pressure. Thus, a honeycomb porous ceramic was formed. A 20×20× 0.3 mm plate-like sample was cut from the honeycomb porous ceramic as a substrate (porous ceramic). The substrate had a porosity of 40% by volume as measured by a mercury intrusion method with a mercury porosimeter (AutoPore IV 9520 manufactured by MicroMetrics, Inc.) and an average pore size of 10 μm as measured by the same method. An alumina powder and a glass powder were mixed at a volume ratio of 98:2 as a raw material of the porous ceramic of the alumina fired product and were pressed into a plate-like formed product. The formed product was fired at 1200° C. for 3 hours in the air at normal pressure. In this manner, a substrate (porous ceramic) 30 mm in diameter and 8 mm in height was produced. The substrate had a porosity of 40% by volume and an average pore size of 10 μm as measured by the mercury intrusion method with the mercury porosimeter (AutoPore IV 9520 manufactured by MicroMetrics, Inc.).

Production of Joined Body

A raw material powder (one of Fe, Cu, Mn, Ni, Mg, and Al) of a joint material and a solvent terpineol were mixed to prepare a joint material paste. The joint material paste was applied to the porous ceramic produced as described above. The joint material paste was also applied to a metal sheet cut in an appropriate size. These were bonded together with the paste interposed therebetween. The metal sheet was made of a Cr—Ni—Fe alloy (SUS 304) or a Cr—Fe alloy (SUS 430). The bonded sample was left to stand overnight at 80° C. in the air, thereby sufficiently evaporating terpineol. The sample was placed with the metal sheet facing upward. While a jig was placed on the sample to restrict the movement of the metal sheet, the sample was fired (joined) in the air at a temperature in the range of 400° C. to 800° C.

Experimental Examples 1 to 3

In Experimental Example 1, the porous ceramic was the Si-bonded SiC fired product, the metal sheet was made of the Cr—Ni—Fe alloy, the raw material of the joint material was an Fe powder having an average particle size of 5 μm, and the joining temperature was 800° C. Joined bodies according to Experimental Examples 2 and 3 were produced under the same conditions as in Experimental Example 1 except that the joining temperatures were 600° C. and 400° C., respectively.

Experimental Examples 4 and 5

A joined body according to Experimental Example 4 was produced under the same conditions as in Experimental Example 1 except that the metal sheet was made of the Cr—Fe alloy. A joined body according to Experimental Example 5 was produced under the same conditions as in Experimental Example 1 except that the porous ceramic was the alumina fired product.

Experimental Examples 6 to 8

A joined body according to Experimental Example 6 was produced under the same conditions as in Experimental Example 1 except that the raw material of the joint material was a Cu powder having an average particle size of 3 μm. A joined body according to Experimental Example 7 was produced under the same conditions as in Experimental Example 6 except that the joining temperature was 500° C. A joined body according to Experimental Example 8 was produced under the same conditions as in Experimental Example 6 except that the porous ceramic was the alumina fired product.

Experimental Example 9

A joined body according to Experimental Example 9 was produced under the same conditions as in Experimental Example 1 except that the raw material of the joint material was a Mn powder having an average particle size of 10

Experimental Examples 10 and 11

A joined body according to Experimental Example 10 was produced under the same conditions as in Experimental Example 1 except that the raw material of the joint material was a Ni powder having an average particle size of 1 μm. A joined body according to Experimental Example 11 was produced under the same conditions as in Experimental Example 1 except that the raw material of the joint material was a Ni powder having an average particle size of 30 μm.

Experimental Examples 12 and 13

A joined body according to Experimental Example 12 was produced under the same conditions as in Experimental Example 1 except that the raw material of the joint material was a Mg powder having an average particle size of 40 μm and that the joining temperature was 550° C. A joined body according to Experimental Example 13 was produced under the same conditions as in Experimental Example 12 except that the joining temperature was 800° C.

Experimental Example 14

A joined body according to Experimental Example 14 was produced under the same conditions as in Experimental Example 12 except that the raw material of the joint material was an Al powder having an average particle size of 5 μm.

Experimental Examples 15 to 17

A joined body according to Experimental Example 15 was produced under the same conditions as in Experimental Example 1 except that the raw material of the joint material was an iron oxide ($Fe_2O_3$) powder having an average particle size of 5 μm. A joined body according to Experimental Example 16 was produced under the same conditions as in Experimental Example 1 except that the joining temperature was 200° C. A joined body according to Experimental Example 17 was produced under the same conditions as in Experimental Example 1 except that the raw material of the joint material was an Fe powder having an average particle size of 53 μm. Table 1 summarizes the material, porosity (% by volume), and average pore size A (μm) of the substrate, the material of the electrode, the type, average particle size B (μm), and average particle size B/average pore size A (B/A) of the raw material of the joint material, and the joining temperature (° C.) and atmosphere for each sample.

TABLE 1

| | Substrate | | | | Raw Material of Joint Material | | | | Joining | |
| --- | --- | --- | --- | --- | --- | --- | --- | --- | --- | --- |
| | | | | | | Raw Material | | | Condition | |
| | | | Average | | | Particle | | | | |
| | | Porosity | Pore Size | Metal Sheet | | Size | | | Temperature | |
| | Material | % | A μm | Material | Metal | B | Oxide | B/A | ° C. | Atmosphere |
| Experimental Example 1 | Si-bonded SiC | 40 | 10 | Cr—Ni—Fe Alloy | Fe | 5 | None | 0.5 | 800 | Air |
| Experimental Example 2 | Si-bonded SiC | 40 | 10 | Cr—Ni—Fe Alloy | Fe | 5 | | 0.5 | 600 | |
| Experimental Example 3 | Si-bonded SiC | 40 | 10 | Cr—Ni—Fe Alloy | Fe | 5 | | 0.5 | 400 | |
| Experimental Example 4 | Si-bonded SiC | 40 | 10 | Cr—Fe Alloy | Fe | 5 | | 0.5 | 800 | |
| Experimental Example 5 | $Al_2O_3$ | 40 | 10 | Cr—Ni—Fe Alloy | Fe | 5 | | 0.5 | 800 | |
| Experimental Example 6 | Si-bonded SiC | 40 | 10 | Cr—Ni—Fe Alloy | Cu | 3 | | 0.3 | 800 | |
| Experimental Example 7 | Si-bonded SiC | 40 | 10 | Cr—Ni—Fe Alloy | Cu | 3 | | 0.3 | 500 | |
| Experimental Example 8 | $Al_2O_3$ | 40 | 10 | Cr—Ni—Fe Alloy | Cu | 3 | | 0.3 | 500 | |
| Experimental Example 9 | Si-bonded SiC | 40 | 10 | Cr—Ni—Fe Alloy | Mn | 10 | | 1.0 | 800 | |
| Experimental Example 10 | Si-bonded SiC | 40 | 10 | Cr—Ni—Fe Alloy | Ni | 1 | | 0.1 | 800 | |
| Experimental Example 11 | Si-bonded SiC | 40 | 10 | Cr—Ni—Fe Alloy | Ni | 30 | | 3.0 | 800 | |
| Experimental Example 12 | Si-bonded SiC | 40 | 10 | Cr—Ni—Fe Alloy | Mg | 40 | | 4.0 | 550 | |
| Experimental Example 13 | Si-bonded SiC | 40 | 10 | Cr—Ni—Fe Alloy | Mg | 40 | | 4.0 | 800 | |
| Experimental Example 14 | Si-bonded SiC | 40 | 10 | Cr—Ni—Fe Alloy | Al | 5 | | 0.5 | 550 | |
| Experimental Example 15 | Si-bonded SiC | 40 | 10 | Cr—Ni—Fe Alloy | None | 5 | $Fe_2O_3$ | 0.5 | 800 | |
| Experimental Example 16 | Si-bonded SiC | 40 | 10 | Cr—Ni—Fe Alloy | Fe | 5 | None | 0.5 | 200 | |
| Experimental Example 17 | Si-bonded SiC | 40 | 10 | Cr—Ni—Fe Alloy | Fe | 53 | | 5.3 | 800 | |

Experimental Examples 18 to 39

In Experimental Examples 18 to 39, the porous ceramic was the Si-bonded SiC fired product, the metal sheet was made of the Fe—Cr alloy, the raw material of the joint material was an Fe powder, a Ni powder, or a Cu powder, and the joining condition was 750° C. in the air. The particle size of the metal raw material of the joint and the addition of a conductive aid (secondary compound) to the joint were examined in these experimental examples. In Experimental Examples 18 to 22, the metal raw material of the joint was the Fe powder, to which 0.5 mol %, 1.0 mol %, 3.0 mol %, 5.0 mol %, and 10 mol % $TiO_2$ were added, respectively. Each of these additive amounts is the number of moles of oxide based on the total of the number of moles of the metal raw material and the number of moles of oxide. In Experimental Examples 23 to 25, the metal raw material of the joint was the Fe powder, to which 1.0 mol %, 3.0 mol %, and 10 mol % $SnO_2$ were added, respectively. In Experimental Examples 26 to 29, the metal raw material of the joint was the Fe powder, to which 3.0 mol %, 5.0 mol %, 10 mol %, and 15 mol % $Nb_2O_5$ were added, respectively. In Experimental Examples 30 to 32, the metal raw material of the joint was the Fe powder, to which 1.0 mol %, 3.0 mol %, and 5.0 mol % $ZrO_2$ were added, respectively. In Experimental Examples 33 and 34, the metal raw material of the joint was the Ni powder, to which 1.0 mol % and 3.0 mol % $LiCO_3$ were added, respectively. In Experimental Examples 35 and 36, the metal raw material of the joint was the Cu powder, and 1.0 mol % and 3.0 mol % $LiCO_3$ were added, respectively. In Experimental Example 37, the metal raw material of the joint was the Fe powder, to which 30 mol % $Fe_2O_3$ and 1.0 mol % $TiO_2$ were added. In Experimental Example 38, the metal raw material of the joint was the Fe powder, to which 50 mol % $Fe_3O_4$ and 1.0 mol % $TiO_2$ were added. In Experimental Example 39, the metal raw material of the joint was the Fe powder, to which 50 mol % FeO and 1.0 mol % $TiO_2$ were added. In Experimental Examples 18 to 32 and 37 to 39, metal raw materials Fe powder (average particle size: 35 μm) and Fe powder (average particle size: 3 μm) were mixed at a volume ratio of 60:40. In Experimental Examples 33 and 34, the metal raw material was a Ni powder (average particle size: 35 μm) alone. In Experimental Examples 35 and 36, the metal raw material was a Cu powder (average particle size: 3 μm) alone. Table 2 summarizes the substrate, the electrode, the type of joint raw material, the amount of oxide added to provide electrical conductivity, the blend ratio of metal raw materials, and the joining conditions for each sample.

TABLE 2

| | Substrate | | Electrode | | Raw Material of Joint Material | | | Blend Ratio of Metal Raw Material/vol % | | Joining Condition | |
|---|---|---|---|---|---|---|---|---|---|---|---|
| | Material | Porosity vol % | Material | Porosity vol % | Metal | Secondary Compound | Amount Added mol % | 3 μm | 35 μm | Temperature ° C. | Atmosphere |
| Experimental Example 18 | Si-bonded SiC | 40 | Fe—Cr Alloy | 0 | Fe | $TiO_2$ | 0.5 | 40 | 60 | 750 | Air |
| Experimental Example 19 | | | | | | $TiO_2$ | | | | | |
| Experimental Example 20 | | | | | | $TiO_2$ | 3 | | | | |
| Experimental Example 21 | | | | | | $TiO_2$ | 5 | | | | |
| Experimental Example 22 | | | | | | $TiO_2$ | 10 | | | | |
| Experimental Example 23 | | | | | | $SnO_2$ | 1 | | | | |
| Experimental Example 24 | | | | | | $SnO_2$ | 3 | | | | |
| Experimental Example 25 | | | | | | $SnO_2$ | 10 | | | | |
| Experimental Example 26 | | | | | | $Nb_2O_5$ | 3 | | | | |
| Experimental Example 27 | | | | | | $Nb_2O_5$ | 5 | | | | |
| Experimental Example 28 | | | | | | $Nb_2O_5$ | 10 | | | | |
| Experimental Example 29 | | | | | | $Nb_2O_5$ | 15 | | | | |
| Experimental Example 30 | | | | | | $ZrO_2$ | 1 | | | | |
| Experimental Example 31 | | | | | | | 3 | | | | |
| Experimental Example 32 | | | | | | | 5 | | | | |
| Experimental Example 33 | | | | | Ni | $LiCO_3$ | 1 | 0 | 100 | | |
| Experimental Example 34 | | | | | | | 3 | | | | |
| Experimental Example 35 | | | | | Cu | $LiCO_3$ | 1 | 100 | 0 | | |
| Experimental Example 36 | | | | | | | 3 | | | | |
| Experimental Example 37 | | | | | Fe | $Fe_2O_3$ | 30 | 40 | 60 | | |
| | | | | | | $TiO_2$ | 1 | | | | |
| Experimental Example 38 | | | | | | $Fe_3O_4$ | 50 | | | | |
| | | | | | | $TiO_2$ | 1 | | | | |
| Experimental Example 39 | | | | | | FeO | 50 | | | | |
| | | | | | | $TiO_2$ | 1 | | | | |

Experimental Examples 40 to 45

In Experimental Examples 40 to 45, the porous ceramic was the Si-bonded SiC fired product, the metal sheet was made of the Fe—Cr alloy, the raw material of the joint material was an Fe powder, $TiO_2$ was added to the joint material as an oxide to provide electrical conductivity, and the joining condition was 750° C. in the air. The blend ratio of raw material powders having different particle sizes in the joint was examined in these experimental examples. A first raw material powder (Fe powder) having an average particle size of 3 μm, which was smaller than the average pore size (10 μm) of the substrate, and a second raw material powder (Fe powder) having an average particle size of 35 μm, which was greater than the average pore size (10 μm) of the substrate, were used in these experimental examples. In Experimental Examples 40 to 45, the first raw material powder and the second raw material powder were mixed at volume ratios of 10:90, 20:80, 30:70, 35:65, 40:60, and 50:50, respectively. Table 3 summarizes the substrate, the electrode, the type of joint raw material, the amount of oxide added to provide electrical conductivity, the blend ratio of metal raw materials, and the joining conditions for each sample.

drawn as measurement lines (lines (1) to (5) in FIG. 2). A point of intersection between the reference line and each of the measurement lines was taken as a starting point. A point

TABLE 3

| | Substrate | | Electrode | | Raw Material of Joint Material | | Blend Ratio of Metal Raw Material/vol % | | Joining Condition | |
|---|---|---|---|---|---|---|---|---|---|---|
| | Material | Porosity vol % | Material | Porosity vol % | Metal | Secondary Compound | Added mol % | 3 μm | 35 μm | Temperature °C. | Atmosphere |
| Experimental Example 40 | Si-bonded SiC | 40 | Fe—Cr Alloy | 0 | Fe | TiO$_2$ | 1 | 10 | 90 | 750 | Air |
| Experimental Example 41 | | | | | | | | 20 | 80 | | |
| Experimental Example 42 | | | | | | | | 30 | 70 | | |
| Experimental Example 43 | | | | | | | | 35 | 65 | | |
| Experimental Example 44 | | | | | | | | 40 | 60 | | |
| Experimental Example 45 | | | | | | | | 50 | 50 | | |

Experimental Examples 46 to 49

In Experimental Examples 46 to 49, the porous ceramic was the Si-bonded SiC fired product, the metal sheet was made of the Fe—Cr alloy, the raw material of the joint material was an Fe powder, TiO$_2$ was added to the joint material as an oxide to provide electrical conductivity, and the joining condition was 750° C. in the air. The porosity of the joint was examined in these experimental examples. In the Experimental Examples 46 to 49, the metal raw material of the joint was an Fe powder (average particle size: 3 μm) alone, to which 1 mol % TiO$_2$ was added, and 50% by volume, 40% by volume, 30% by volume, and 20% by volume pore-forming material (poly(methyl methacrylate) resin) were added, respectively. Table 4 summarizes the substrate, the electrode, the type of joint raw material, the amount of oxide added to provide electrical conductivity, the blend ratio of metal raw materials, the blend ratio of the pore-forming material, and the joining conditions for each sample.

of intersection between the lower end of the oxide ceramic and each of the measurement lines was taken as an end point. The length between the starting point and the end point was measured for the five measurement lines. The five lengths were corrected for the magnification and were averaged to determine the penetration depth.

(Thermal Analysis of Joint Material)

Figure 5:
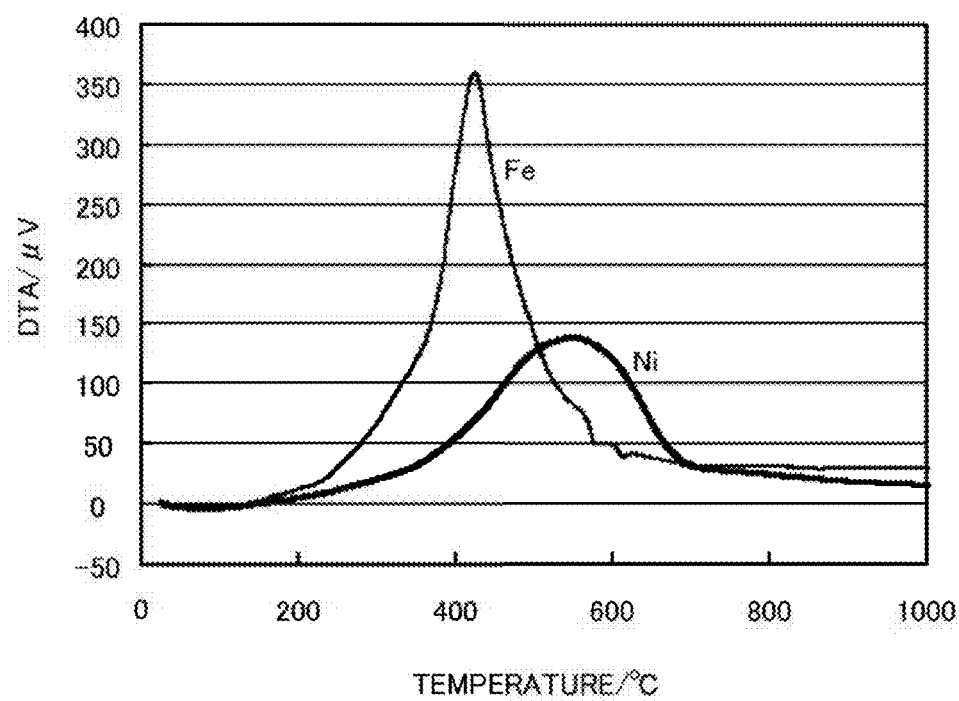
FIG. 5 is a thermal analysis result for metal raw materials of a joint.

Among the metals used in the joined body, Fe and Ni were subjected to thermal analysis. Eighty milligrams of a sample was subjected to measurement with a TG-DTA measuring instrument (ThremoPlus EVO manufactured by Rigaku Corporation) from room temperature to 1000° C. FIG. 5 is a thermal analysis result for the metal raw materials of the joint. Fe started to generate heat at 200° C. and had an exothermic peak at 420° C. Ni started to generate heat at 200° C. and had an exothermic peak at 550° C. It was found that these metals could easily form oxides when heated at 400° C. or more and were therefore preferred. It was surmised that joining treatment could be performed with a

TABLE 4

| | Substrate | | Electrode | | Raw Material of Joint Material | | Blend Ratio of Metal Raw Material/vol % | | Bkend Ratio of Pore-formig | Joining Condition | |
|---|---|---|---|---|---|---|---|---|---|---|---|
| | Material | Porosity vol % | Material | Porosity vol % | Metal | Secondary Compound | Added mol % | 3 μm | 35 μm | Material vol % | Temperature °C. | Atmosphere |
| Experimental Example 46 | Si-bonded SiC | 40 | Fe—Cr Alloy | 0 | Fe | TiO$_2$ | 1 | 100 | 0 | 50 | 750 | Air |
| Experimental Example 47 | | | | | | | | | | 40 | | |
| Experimental Example 48 | | | | | | | | | | 30 | | |
| Experimental Example 49 | | | | | | | | | | 20 | | |

Penetration Depth of Joint Material

The joined body thus produced was embedded in a resin, and a cross section in which the porous ceramic, the metal sheet, and the joint (oxide ceramic) could be simultaneously observed was mirror-polished. The polished surface was observed with an electron microscope (SEM; XL30 manufactured by Royal Philips Electronics) at a magnification of 200, and microstructure photographs were taken. As illustrated in FIG. 2, a line parallel to the lower end line of the metal sheet was drawn in contact with the uppermost portion of the porous ceramic. This line was taken as a reference line (the dash-dot line in FIG. 2) located at a penetration depth of 0. The reference line was divided into six equal parts, and five straight lines perpendicular to the six equal parts were higher amount of heat than the amount of heat obtained at the firing temperature due to the amount of heat resulting from the heat generation.

(Identification of Crystal Phase of Joint Material)

The constituent crystal phase of the oxide ceramic was identified in the joined body thus produced. In the measurement, X-ray diffraction patterns of the material were obtained with a rotating anode X-ray diffractometer (RINT manufactured by Rigaku Corporation). The X-ray diffraction measurement conditions were as follows: a CuKα radiation source, 50 kV, 300 mA, and 2θ=10 to 60 degrees.

(Thickness of Reaction Layer at Interface)

The joining interface was examined in the joined body thus produced. The thickness of a reaction layer at the interface between the porous ceramic and the joint was measured in an image taken in electron microscope (SEM) observation. More specifically, the joined body embedded in a resin was mirror-polished with diamond slurry to prepare an observation sample. The polished cross section was observed with SEM-EDX at a magnification of 3000. Then, perpendicular lines (measurement lines) that were perpendicular to the interface in the image and divided the interface into five equal parts were drawn. The length between the points of intersection between the lower end and the upper end of the reaction layer at the interface and each of the measurement lines was measured. The five lengths were averaged to determine the thickness of the reaction layer. When a contrast due to a difference in composition at the interface was not observed even with SEM at a magnification of 3000, the reaction layer was considered to be "absent".

(Porosity of Joint Material)

Figure 6:
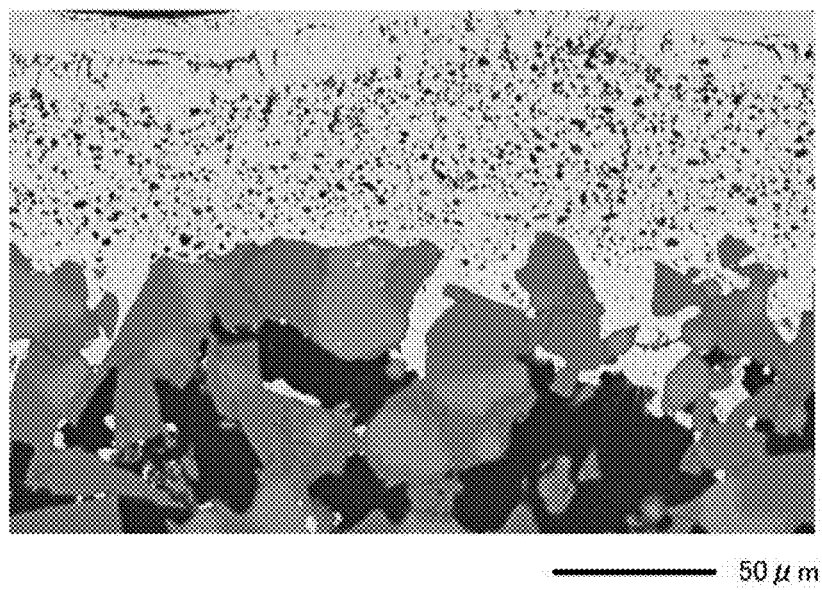
FIG. 6 is a SEM photograph of a cross section of a joined body.

A microstructure photograph image thus taken was subjected to image analysis to determine the porosity of the oxide ceramic. The porosity of the oxide ceramic of a non-penetrating portion other than the portion that penetrated into the pores of the porous ceramic and the porosity of the oxide ceramic of the penetrating portion that penetrated into the pores of the porous ceramic were determined. FIG. 6 is a SEM photograph of a cross section of the joined body according to Experimental Example 1. Image-Pro 0.5J was used as image analysis software. A region having an area of $0.5 \times 10^{-6}$ m$^2$ in the non-penetrating portion was chosen in a microstructure photograph and was subjected to binarization treatment to distinguish the pore images from the oxide ceramic image. In the distinguished image, the oxide ceramic was separated from the pores in the non-penetrating portion, and their area ratio was calculated as the porosity of the non-penetrating portion. The area ratio in the cross section was assumed to correspond substantially to the volume ratio and was considered to be the porosity (% by volume). A region having a total area of $1.5 \times 10^{-8}$ m$^2$ between the reference line and the porous ceramic was chosen in the microstructure photograph and was subjected to binarization treatment to distinguish the pore images from the oxide ceramic image. In the image subjected to the binarization treatment, in the same manner as in the non-penetrating portion, the oxide ceramic was separated from the pores, and their area ratio was calculated as the porosity of the penetrating portion.

(Joining Capability)

The joining capability of the joined body was evaluated by SEM observation of a cross section of the joined body. An observation sample was prepared by embedding a joined body according to the present invention in a resin and mirror-polishing the joined body with diamond slurry or the like. The sample was then inspected with SEM at a magnification of 1500 or more for separation between the porous ceramic, the metal member, and the joint, and for cracks in the porous ceramic, the metal member, and the joint. Joining capability was then rated according to the following criteria. Observation of no separation and no crack was rated as "A". Observation of significant separation or crack was rated as "C".

(Joining Strength)

The joining strength of the joined body was measured in a tensile test of the porous ceramic and the metal sheet (according to JIS-R1606). The porous ceramic was bonded to a measuring jig, and the metal sheet was bonded to a measuring jig. The tensile strength was measured with a strength tester (Instron universal testing machine). Joining strength was rated according to the following criteria. A tensile strength of 5.0 MPa or more was rated as "A", a tensile strength of 3.0 MPa or more and less than 5.0 MPa was rated as "B", a tensile strength of 1.5 MPa or more and less than 3.0 MPa was rated as "C", and a tensile strength of less than 1.5 MPa was rated as "D".

(Electrical Conductivity)

Figure 7:
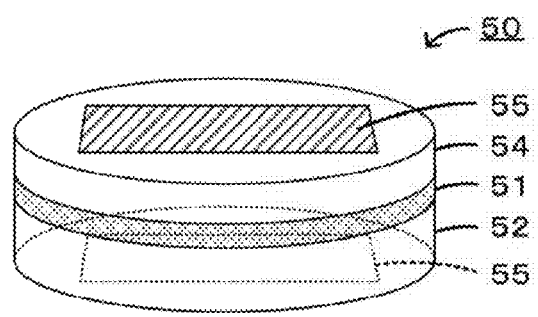
FIG. 7 is an explanatory view of a joined body 50.

The electrical conductivity of the joined body was measured in a joined body 50 illustrated in FIG. 7. As illustrated in FIG. 7, a sample was prepared by joining a disk-shaped porous ceramic 52 to a disk-shaped metal member 24 with a joint 51 to form a disk having a diameter of 15 mm and baking a Ag paste as electrodes 55. A two-terminal method was used for the measurement. Electrical conductivity was rated according to the following criteria. An electrical conductivity of $10^{-2}$ S/cm or more was rated as "A", $10^{-3}$ S/cm or more and less than $10^{-2}$ S/cm was rated as "B", $10^{-6}$ S/cm or more and less than $10^{-3}$ S/cm was rated as "C", and $10^{-6}$ S/cm or less or unmeasurable was rated as "D".

(Heat Resistance Test)

In the heat resistance test of the joined body, a joined body sample for joining strength measurement was held at 800° C. for 24 hours in the air. After the heat resistance test, strength and electrical conductivity were measured as described above. Heat resistance was rated as "A" when the joining strength or conductivity was not changed by the heat resistance test. When the joining strength or conductivity was changed, a change in joining strength rated as "B" or better and a change in conductivity rated as "B" or better were rated as "B". A change in conductivity rated as "C" or better was rated as "C". A change in joining strength rated as "D" and a change in conductivity rated as "D" were rated as "D".

(Overall Rating)

On the basis of the measurement results described above, each sample was comprehensively evaluated. The initial performance rating was determined from the evaluation results of each joined body before the heat resistance test. When the joining capability was rated as "A", and the joining strength was rated as "A", and the electrical conductivity was rated as "A", the initial performance rating was "A (excellent)". When the joining capability was rated as "A", and the joining strength was rated as "A", and the electrical conductivity was rated as "B", the initial performance rating was "B (good)". When the joining capability was rated as "A", the joining strength was rated as "B", and the electrical conductivity was rated as "A" or "B", the initial performance rating was "B (good)". When the joining capability was rated as "A", and the joining strength was rated as "C", or the electrical conductivity was rated as "C", the initial performance rating was "C (fair)". When the joining capability was rated as "C", the initial performance rating was "D (poor)". When the initial performance rating and the heat resistance rating were "A", the overall rating was "A". When at least one of the initial performance rating and the heat resistance rating was "B" or better, that is, the two ratings were and "B", "B" and "A", or "B" and "B", the overall rating was "B". When at least one of the initial performance rating and the heat resistance rating was "C", that is, the two ratings were "C" and "A" or "C" and "C", the overall rating was "C". When at least one of the initial performance rating and the heat resistance rating was unmeasurable, the overall rating was "F".

(Results and Discussion)

Table 5 shows the measurement results for Experimental Examples 1 to 17. Table 5 summarizes the crystal phase and volume change of the joint (oxide ceramic), the penetration depth of the joint material (μm), the porosity (% by volume)

of the joint (non-penetrating portion), the thickness of the reaction layer between the substrate and the joint material, joining capability, joining strength, electrical conductivity, initial performance rating, strength and electrical conductivity after the heat resistance test, heat resistance rating, and overall rating. As shown in Table 5, the crystal phase of the joint in Experimental Examples 1 to 17 was an oxide layer. In Experimental Examples 1 to 17, no reaction layer containing a composite phase or the like formed by a reaction between the substrate and the joint was observed between the substrate and the joint. The volume change ratio Y/X of the volume Y after oxidation to the volume X before the oxidation was 2.14 for $Fe_2O_3/Fe$, 1.77 for CuO/Cu, 2.22 for $Mn_2O_3/Mn$, 1.62 for NiO/Ni, 0.79 for MgO/Mg, and 1.28 for $Al_2O_3/Al$. In Experimental Examples 1 to 14, the joining strength was 1.5 MPa or more and good. In contrast, in Experimental Examples 15 to 17, the joining strength was less than 1.5 MPa. The penetration depth of the oxide ceramic penetrating into the pores of the substrate was 8 μm or less in Experimental Examples 15 to 17 or 10 μm or more in Experimental Examples 1 to 14. It was surmised that the penetration depth correlated with the joining strength. In particular, in Experimental Examples 1 to 11, which had a penetration depth of 15 μm or more, the joining strength was increased to 3.0 MPa or more. The penetration depth probably correlated with the volume change ratio, and it was found that the volume change ratio was preferably 0.7 or more, more preferably 1.3 or more, still more preferably 1.6 or more. It was also found that the ratio B/A of the average particle size B (μm) of the raw material powder of the oxide ceramic to the average pore size A (μm) of the porous ceramic preferably ranged from 0.1 to 5.0. It was surmised that the raw material particles in this range in the joint could easily penetrate into the pores of the substrate when fired. It was found that the non-penetrating portion of the joint (oxide ceramic) other than the penetrating portion in which the oxide ceramic penetrated into the pores preferably had a porosity of 60% or less by volume, more preferably 50% or less by volume, still more preferably 30% or less by volume. It was also found that the joint that penetrated into the pores of the substrate preferably had a porosity of 50% or less by volume, more preferably 30% or less by volume, still more preferably 20% or less by volume, most preferably 5% or less by volume. Experimental Examples 1 to 14 had good performance after the heat resistance test. In particular, Experimental Examples 1 to 11 had good overall ratings. The experimental examples according to the present invention very advantageously require no atmosphere control for joining, such as vacuum or an inert gas atmosphere, and allow joining at low temperatures in the air.

In Experimental Example 16, in which the joining temperature was as low as 200° C., the penetration depth in the substrate was shallow, and the joining strength was low. Thus, it was found that the joining temperature was preferably 400° C. or more. Considering the heat resistance of the metal sheet, it was surmised that the joining temperature should be 900° C. or less, preferably 800° C. or less. In Experimental Example 17, in which the raw material of the joint had an average particle size of 50 μm or more, the penetration depth in the substrate was shallow, and the joining strength was low. Thus, it was found that the raw material of the joint preferably had an average particle size of 40 μm or less. Experimental Examples 4, 5, 7, and 8 showed that the results similar to those in Experimental Example 1 were obtained regardless of differences in the materials of the porous ceramic and/or the metal sheet. Thus, it was found that a joined body that included a porous ceramic, a metal member, and a joint of an oxide ceramic that penetrated into the pores of the porous ceramic and joined the porous ceramic to the metal member could have more simple and more reliable joining.

TABLE 5

| | Joint | | Penetration Depth of Joint Material | Porosity | Porosity of Penetrated Portion of Joint vol % | Reaction Layer Between Substrate and Joint Material Thickness | Joining Capability | Joining Strength | Electrical Conductivity of Joined Body | Initial Performance Rating | Strength After Heat Resistance Test | Electrical Conductivity After Heat Resistance Test | Heat Resistance Rating | Overall Rating |
|---|---|---|---|---|---|---|---|---|---|---|---|---|---|---|
| | Crystal Phase | Volume Change by Joining | into Substrate μm | of Joint vol % | | | | | | | | | | |
| Experimental Example 1 | $Fe_2O_3$ $Fe_3O_4$ | 2.14 | 28 | 17.2 | 11.2 | None | A | A | A | A | A | B | B | B |
| Experimental Example 2 | | | 27 | 25.0 | 10.8 | | A | A | A | A | A | B | B | B |
| Experimental Example 3 | | | 36 | 20.0 | 11.5 | | A | A | A | A | A | B | B | B |
| Experimental Example 4 | | | 30 | 14.7 | 9.8 | | A | A | A | A | A | B | B | B |
| Experimental Example 5 | | | 35 | 7.5 | 5.0 | | A | A | A | A | A | B | B | B |
| Experimental Example 6 | CuO | 1.77 | 28 | 20.0 | 3.2 | | A | A | A | A | A | B | B | B |
| Experimental Example 7 | CuO | 1.77 | 25 | 15.0 | 3.5 | | A | A | A | A | A | B | B | B |
| Experimental Example 8 | CuO | 1.77 | 32 | 13.2 | 3.0 | | A | A | A | A | A | B | B | B |
| Experimental Example 9 | $Mn_2O_3$ | 2.22 | 20 | 13.2 | 12.0 | | A | A | A | A | A | B | B | B |
| Experimental Example 10 | NiO | 1.62 | 40.6 | 2.5 | 0.5 | | A | B | B | B | B | B | A | B |
| Experimental Example 11 | NiO | 1.62 | 20.6 | 25.0 | 25.0 | | A | B | B | B | B | B | A | B |

TABLE 5-continued

| | Joint | | Penetration Depth of Joint Material into Substrate µm | Porosity | Porosity of Penetrated Portion of Joint vol % | Reaction Layer Between Substrate and Joint Material Thickness | Joining Capability | Joining Strength | Electrical Conductivity of Joined Body | Initial Performance Rating | Heat Resistance Test | Strength After Heat Resistance Test | Electrical Conductivity After Heat Resistance Rating | Overall Rating |
|---|---|---|---|---|---|---|---|---|---|---|---|---|---|---|
| | Crystal Phase | Volume Change by Joining | | | | | | | | | | | | |
| Experimental Example 12 | MgO | 0.79 | 10 | 55.8 | 42.0 | A | C | C | C | C | C | C | A | C |
| Experimental Example 13 | MgO | 0.79 | 9.5 | 57.8 | 35.2 | A | C | C | C | C | C | C | A | C |
| Experimental Example 14 | Al$_2$O$_3$ | 1.28 | 10 | 50.8 | 45.1 | A | C | C | C | C | C | C | A | C |
| Experimental Example 15 | Fe$_2$O$_3$ | 1.00 | 8 | Cannot Be Observed | | C | D | Unmeasurable | D | Unmeasurable | | | | F |
| Experimental Example 16 | Fe$_2$O$_3$ | 2.14 | 8 | | | C | D | | D | | | | | F |
| Experimental Example 17 | Fe$_2$O$_3$ | 2.14 | 8 | | | C | D | | D | | | | | F |

Table 6 summarizes the measurement results for Experimental Examples 18 to 39. In Experimental Examples 18 to 39, the joint contained a conductive aid (TiO$_2$, SnO$_2$, Nb$_2$O$_5$, ZrO$_2$, LiCO$_3$, Fe$_2$O$_3$, Fe$_3$O$_4$, or FeO). Table 6 shows that Experimental Examples 18 to 39 had very high electrical conductivities and heat resistance ratings. Experimental Examples 18 to 39 also had higher initial electrical conductivities than Experimental Examples 1 to 5, which contained no conductive aid. Thus, it was found to be preferable for the oxide ceramic to contain a conductive aid. It was also found that the addition of such a conductive aid could further reduce the resistance of the joint. Thus, it was found that the joint could preferably be used as a current-carrying member because of its low heat generation. It was also found that the addition of a conductive aid could provide additional electrical conductivity due to a solid solution of an element of the conductive aid in the oxide ceramic and further suppress a decrease in electrical conductivity under heating. For example, if the main oxide of the oxide ceramic is an Fe oxide, then a heterophase, such as Fe$_3$O$_4$, or an oxygen defect introduced into Fe$_2$O$_3$ probably imparts electrical conductivity to the oxide ceramic. However, the heat resistance test tended to decrease such a heterophase and oxygen defects and lower the electrical conductivity (Experimental Examples 1 to 5). In contrast, it was surmised that when the conductive aid contained a different element (Experimental Examples 18 to 32), a solid solution of the different element in the main oxide Fe$_2$O$_3$ contributed to electrical conductivity, thereby improving the heat resistance rating.

TABLE 6

| | Joint | | Penetration Depth of Joint Material into Substrate µm | Porosity | Porosity of Penetrated Portion of Joint vol % | Reaction Layer Between Substrate and Joint Material Thickness | Joining Capability | Joining Strength | Electrical Conductivity of Joined Body | Initial Performance Rating | Heat Resistance Test | Strength After Heat Resistance Test | Electrical Conductivity After Heat Resistance Rating | Overall Rating |
|---|---|---|---|---|---|---|---|---|---|---|---|---|---|---|
| | Crystal Phase | Volume Change by Joining | | | | | | | | | | | | |
| Experimental Example 18 | Fe$_2$O$_3$ | 2.14 | 25 | 18 | 11.7 | None | A | A | A | A | A | A | A | A |
| Experimental Example 19 | | | 30 | 8 | 3.5 | | A | A | A | A | A | A | A | A |
| Experimental Example 20 | | | 32 | 22 | 12.7 | | A | A | A | A | A | A | A | A |
| Experimental Example 21 | | | 28 | 16 | 10.7 | | A | A | A | A | A | A | A | A |
| Experimental Example 22 | | | 32 | 21 | 14.0 | | A | A | A | A | A | A | A | A |
| Experimental Example 23 | | | 22 | 22 | 3.5 | | A | A | A | A | A | A | A | A |
| Experimental Example 24 | | | 35 | 18 | 4.2 | | A | A | A | A | A | A | A | A |
| Experimental Example 25 | | | 24 | 9 | 2.0 | | A | A | A | A | A | A | A | A |
| Experimental Example 26 | | | 32 | 21 | 19.1 | | A | A | A | A | A | A | A | A |

TABLE 6-continued

| | Joint | | Penetration Depth of Joint Material into Substrate μm | Porosity of Joint vol % | Porosity of Penetrated Portion of Joint vol % | Reaction Layer Between Substrate and Joint Material Thickness | Joining Capability | Joining Strength | Electrical Conductivity of Joined Body | Initial Performance Rating | Heat Resistance Test | Heat Resistance Test | Heat Resistance Rating | Overall Rating |
|---|---|---|---|---|---|---|---|---|---|---|---|---|---|---|
| | Crystal Phase | Volume Change by Joining | | | | | | | | | Strength After | Electrical Conductivity After | | |
| Experimental Example 27 | | | 26 | 15 | 3.0 | | A | A | A | A | A | A | A | A |
| Experimental Example 28 | | | 29 | 16 | 16.0 | | A | A | A | A | A | A | A | A |
| Experimental Example 29 | | | 31 | 13 | 9.8 | | A | A | A | A | A | A | A | A |
| Experimental Example 30 | | | 19 | 14 | 8.5 | | A | A | A | A | A | A | A | A |
| Experimental Example 31 | | | 22 | 12 | 10.7 | | A | A | A | A | A | A | A | A |
| Experimental Example 32 | | | 31 | 10 | 6.5 | | A | A | A | A | A | A | A | A |
| Experimental Example 33 | NiO | 1.62 | 21 | 20 | 8.6 | | A | B | B | B | B | B | A | B |
| Experimental Example 34 | | | 22 | 18 | 10.4 | | A | B | A | B | B | A | A | B |
| Experimental Example 35 | CuO | 1.77 | 32 | 13.5 | 9.0 | | A | A | A | B | A | B | A | B |
| Experimental Example 36 | | | 27 | 14 | 9.3 | | A | A | A | B | A | A | A | B |
| Experimental Example 37 | $Fe_2O_3$ | 2.14 | 26 | 10 | 1.6 | | A | B | A | B | B | A | A | B |
| Experimental Example 38 | $Fe_2O_3$, $Fe_3O_4$ | 2.14 | 20 | 9.8 | 8.5 | None | A | B | A | B | B | A | A | A |
| Experimental Example 39 | $Fe_2O_3$, $Fe_3O_4$ | 2.14 | 23 | 12.1 | 10.2 | | A | B | A | B | B | A | A | A |

Table 7 summarizes the measurement results for Experimental Examples 40 to 45. As shown in Table 7, in Experimental Example 40, in which the metal raw material of the joint had a relatively large particle size, the joint did not deeply penetrate into the substrate, and the joining strength was very low. In Experimental Examples 41 to 45, in which larger particles (35 μm) and smaller particles (3 μm) were mixed at a suitable ratio, the joint sufficiently penetrated into the substrate and was good. When the joint is subjected to joining treatment with only a raw material powder having a small average particle size, the volume of the joint sometimes changes more greatly due to firing shrinkage or the like, and the strength of the joint is sometimes decreased. It was found that when the oxide ceramic contained large and small raw material particles mixed at a volume ratio in the range of 50:50 to 80:20, the joining strength could be increased.

TABLE 7

| | Joint | | Penetration Depth of Joint Material into Substrate μm | Porosity of Joint vol % | Porosity of Penetrated Portion of Joint vol % | Reaction Layer Between Substrate and Joint Material Thickness | Joining Capability | Joining Strength | Initial Performance Rating |
|---|---|---|---|---|---|---|---|---|---|
| | Crystal Phase | Volume Change by Joining | | | | | | | |
| Experimental Example 40 | $Fe_2O_3$ | 2.14 | 7 | 21.0 | Unmeasurable | None | A | D | D |
| Experimental Example 41 | | | 11.0 | 9.4 | 7.9 | | A | B | B |
| Experimental Example 42 | | | 15.8 | 10.6 | 9.3 | | A | B | B |
| Experimental Example 43 | | | 21.1 | 19.6 | 11.8 | | A | A | A |
| Experimental Example 44 | | | 31.6 | 12.1 | 10.4 | | A | A | A |
| Experimental Example 45 | | | 19.7 | 10.6 | 6.0 | | A | A | A |

Table 8 summarizes the measurement results for Experimental Examples 46 to 49. As shown in Table 8, the joining strength was improved in Experimental Examples 48 and 49, in which the porosity of the joint (non-penetrating portion) was increased to 20% or more by volume by the addition of a pore-forming material. Experimental Examples 48 and 49 also had higher initial joining strength than Experimental Examples 1 to 5, to which no pore-forming material was added. This is probably because of improved stress relaxation of the joint. In Experimental Examples 46 and 47, in which the joint had a porosity of 40% or more by volume, the joining strength was decreased. This is probably because of decreased strength of the joint. Thus, it was found to be preferable to appropriately determine the porosity of the joint on the basis of the relationship between the degree of stress relaxation and the mechanical strength of the joint.

TABLE 8

| Joint | | Penetration Depth of Joint Material into Substrate μm | Porosity of Penetrated Portion of Joint vol % | Reaction Layer Between Substrate and Joint Material Thickness | Joining Capability | Joining Strength | Electrical Conductivity | Initial Performance Rating |
|---|---|---|---|---|---|---|---|---|
| Crystal Phase | Volume Change by Joining | | Porosity of Joint vol % | | | | | |
| Experimental Example 46 | Fe$_2$O$_3$ | 2.14 | 11.0 | 54.8 | 4.0 | None | A | C | A | C |
| Experimental Example 47 | | | 12.0 | 43.5 | 3.5 | | A | C | A | C |
| Experimental Example 48 | | | 12.5 | 30.7 | 4.3 | | A | A | A | A |
| Experimental Example 49 | | | 18.0 | 21.0 | 7.7 | | A | A | A | A |

The present application claims priority from Japanese patent application No. 2013-056631 filed on Mar. 19, 2013, the entire contents of which are incorporated herein by reference.

What is claimed is:

1. A joined body, comprising:
a porous ceramic;
a metal member; and
a joint of an oxide ceramic that penetrates into pores of the porous ceramic and joins the porous ceramic to the metal member,
wherein a penetration depth of the oxide ceramic into the ores of the porous ceramic is 10 μm or more.

2. The joined body according to claim 1, wherein a penetration depth of the oxide ceramic in the pores of the porous ceramic is in the range of 15 to 50 μm.

3. The joined body according to claim 1, wherein the average pore size of the porous ceramic is A (μm), the average particle size of a raw material powder of the oxide ceramic is B (μm), and B/A is in the range of 0.1 to 5.0.

4. The joined body according to claim 1, wherein the thickness of a reaction layer at an interface between the porous ceramic and the oxide ceramic is 0.1 μm or less.

5. The joined body according to claim 1, wherein the porosity of the oxide ceramic penetrating into the porous ceramic is in the range of 0% to 50% by volume.

6. The joined body according to claim 1, wherein the joint includes a penetrating portion in which the oxide ceramic penetrates into the pores and a non-penetrating portion other than the penetrating portion, and the porosity of the non-penetrating portion is in the range of 0% to 60% by volume.

7. The joined body according to claim 1, wherein the oxide ceramic contains at least one selected from Fe, Ni, Mn, Cu, Ti, V, Mg, and Al.

8. The joined body according to claim 1, wherein the oxide ceramic contains, in addition to a primary component being a main component and a metallic component, a secondary component being at least one of Li, Na, K, Ga, Si, Zr, Ti, Sn, Nb, Sb, and Ta.

9. The joined body according to claim 1, wherein the porous ceramic is a composite material containing SiC and Si bonding SiC, and the SiC and the Si form the pores.

10. The joined body according to claim 1, wherein the porous ceramic has a honeycomb structure comprising partition walls forming a plurality of cells serving as a flow path of a fluid.

11. The joined body according to claim 1, wherein the metal member is an alloy containing at least Fe and Cr.

12. The joined body according to claim 1, wherein the metal member is an alloy in which Fe constitutes 70% or more by mass and less than 90% by mass and Cr constitutes 10% or more by mass and less than 30% by mass.

13. The joined body according to claim 1, wherein the joint is the oxide ceramic formed by placing a metal raw material between the porous ceramic and the metal member and firing the metal raw material in an oxidizing atmosphere at a temperature in the range of 400° C. to 900° C.

14. The joined body according to claim 1, wherein the electrical conductivity of the joined body is $10^{-6}$ S/cm or more.

15. A method for producing a joined body of a porous ceramic and a metal member joined together, comprising:
a joining step of forming a joint by placing a metal raw material between the porous ceramic and the metal member and firing the metal raw material in an oxidizing atmosphere at a temperature in the range of 400° C. to 900° C., wherein an oxide ceramic produced by oxidation of the metal raw material penetrates into pores of the porous ceramic,
wherein a penetration depth of the oxide ceramic into the pores of the porous ceramic is 10 μm or more.

16. The method for producing a joined body according to claim 15, wherein the average particle size of the metal raw material in the joining step is in the range of 1 to 40 μm.

17. The method for producing a joined body according to claim 15, wherein raw materials satisfying B/A in the range of 0.1 to 5.0 are used in the joining step, wherein the average pore size of the porous ceramic is A (μm), and the average particle size of the raw material powder of the oxide ceramic is B (μm).

18. The method for producing a joined body according to claim 15, wherein the metal raw material is fired in the joining step while the metal member is restricted in its movements.

19. The method for producing a joined body according to claim 15, wherein the metal raw material having a volume change ratio of 0.7 or more is used in the joining step, the volume change ratio being a ratio of a volume after oxidation to a volume before the oxidation.

20. The method for producing a joined body according to claim 15, wherein the metal raw material having a volume change ratio of 1.3 or more is used in the joining step, the volume change ratio being a ratio of a volume after oxidation to a volume before the oxidation.

21. The method for producing a joined body according to claim 15, wherein a raw material containing, in addition to a primary component being a main component and a metallic component, a secondary component being at least one of Li, Na, K, Ga, Si, Zr, Ti, Sn, Nb, Sb, and Ta is placed between the porous ceramic and the metal member in the joining step.

* * * * *